(12) United States Patent
Perkins et al.

(10) Patent No.: US 7,502,946 B2
(45) Date of Patent: Mar. 10, 2009

(54) USING HARDWARE TO SECURE AREAS OF LONG TERM STORAGE IN CE DEVICES

(75) Inventors: Gregory M Perkins, Pennington, NJ (US); David Alan Braun, Denville, NJ (US)

(73) Assignee: Panasonic Corporation, Osaka (JP)

( * ) Notice: Subject to any disclaimer, the term of this patent is extended or adjusted under 35 U.S.C. 154(b) by 749 days.

(21) Appl. No.: 11/038,969

(22) Filed: Jan. 20, 2005

(65) Prior Publication Data

US 2006/0161750 A1    Jul. 20, 2006

(51) Int. Cl.
*G06F 11/30* (2006.01)
(52) U.S. Cl. ............... 713/193; 711/163; 711/164; 713/187; 713/188; 713/194; 380/22; 455/26.1; 726/17
(58) Field of Classification Search ........... 711/164, 711/163; 726/17; 713/187, 188, 193, 194; 705/18; 380/22; 455/26.1; 327/545, 546
See application file for complete search history.

(56) References Cited

U.S. PATENT DOCUMENTS

| | | | |
|---|---|---|---|
| 5,623,637 A | 4/1997 | Jones et al. | |
| 5,844,986 A | 12/1998 | Davis | |
| 5,973,968 A | 10/1999 | Schu et al. | |
| 6,397,331 B1 | 5/2002 | Ober et al. | |
| 6,595,856 B1 | 7/2003 | Ginsburg et al. | |
| 2002/0099950 A1* | 7/2002 | Smith | 713/200 |
| 2003/0037246 A1 | 2/2003 | Goodman et al. | |
| 2003/0140049 A1 | 7/2003 | Radatti | |
| 2003/0177371 A1 | 9/2003 | Rothrock et al. | |
| 2003/0188180 A1 | 10/2003 | Overney | |
| 2003/0196102 A1 | 10/2003 | McCarroll | |

FOREIGN PATENT DOCUMENTS

WO  WO 2004/057434 A2  7/2004
WO  WO 2004/086228 A1  7/2004

OTHER PUBLICATIONS

International Search Report dated Jun. 23, 2006.

* cited by examiner

*Primary Examiner*—Reza Mohammad
*Assistant Examiner*—April Y Shan
(74) *Attorney, Agent, or Firm*—RatnerPrestia (57) ABSTRACT

A system includes long-term storage (e.g., flash memory) for storing sensitive data and critical components of a consumer electronic (CE) device such as an operating system (OS) kernel, private cryptographic key values, security applications, and firmware configurations, for example. Security hardware/software designates and restricts access to secured portions of long-term storage that contain the critical components. Requests for access to these secured portions are addressed by the security hardware/software, which authenticates a cryptographic authorization code received with the request. Read-write access to the secured portions is allowed for download and installation of, for example, a software or firmware upgrade if the cryptographic authorization code is authenticated.

10 Claims, 8 Drawing Sheets

Fig. 1

|   | $\beta_1$ | $\beta_2$ | $\beta_3$ | ... | $\beta_m$ |
|---|---|---|---|---|---|
| $\alpha_1$ | $p_{1,1}$ | $p_{1,2}$ | $p_{1,3}$ | ... | $p_{1,m}$ |
| $\alpha_2$ | $p_{2,1}$ | $p_{2,2}$ | $p_{2,3}$ | ... | $p_{2,m}$ |
| $\alpha_3$ | $p_{3,1}$ | $p_{3,2}$ | $p_{3,3}$ | ... | $p_{3,m}$ |
| ... | | | | . | |
| $\alpha_n$ | $p_{n,1}$ | $p_{n,2}$ | $p_{(n,3)}$ | ... | $p_{n,m}$ |

USING HARDWARE TO SECURE AREAS OF LONG TERM STORAGE IN CE DEVICES

TECHNICAL FIELD

The present invention relates generally to a device security system and, more particularly, to a system and method of securing the long term storage of consumer electronic (CE) devices.

BACKGROUND OF THE INVENTION

In the field of consumer or compact electronics (CE), devices typically employ numerous software programs, firmware drivers, communications protocols and security protocols on top of an operating system (OS) (e.g., proprietary OS, PALM OS, Windows CE, embedded Linux, etc.).

At least some of the programs, drivers, and protocol data may relate to sensitive material such as private and public cryptographic keys and security algorithms for decrypting and encrypting transmissions to and from the CE device. Accordingly, it is desirable for manufacturers of CE devices to secure sensitive software, firmware, and security information that reside on a long term memory (e.g., a flash memory) of the CE device. By doing so, manufacturers may prevent malicious users from circumventing device security features such as the Contents Scrambling System (CSS) algorithm used to enable copy protection in Digital Versatile Discs (DVDs), for example.

Currently, the security of long term memory in CE devices is lacking. Some devices attempt to use the operating system to secure the file system, but most operating systems do not provide adequate security for their file systems. Other methods may implement security with password protection or through the basic input/output system (BIOS), but these methods are limited, under user control and/or only provide weak security.

Further, manufacturers may wish to perform secure large-scale upgrades to CE device software for a plurality of CE devices. This may be done through the use of conventional symmetric cryptographic algorithms, which allow pairs of users, who each share a common secret key, to exchange private messages even when communicating over a public network (e.g., the Internet). Such systems possess very fast software implementations, inexpensive and fast hardware implementations, and, most importantly, are very secure. In fact, their security simply relies on one-way functions: functions f that are relatively easy to evaluate but hard to invert, that is, for which it is hard, given a generic value z=f(x), to find any value y such that $f^1(y)=z$. Block ciphers such as the Data Encryption Standard (DES) and triple DES (3DES), for example, are based on Fiestal networks and are invertible. One-way hash functions are one-way (and thus not invertible), as they are a many to one mapping. The security of symmetric cryptographic methods results from their output being nearly indistinguishable (to an extent) from a randomly generated output.

Despite these main advantages, conventional symmetric cryptosystems are not very useful for large-scale communications platforms in which several users require secured communication with each other. Prior exchange of a common secret key (e.g., by physically meeting in a secure location) with every person with whom one wants to communicate in private may be difficult.

To overcome this difficulty, several asymmetric cryptographic methods have been developed that allow two people to agree on common secret keys in a convenient manner. Asymmetric cryptographic methods are far more expensive computationally than symmetric cryptographic methods. Unfortunately, until now all publicly known protocols for this task are based either on the assumed computational difficulty of a particular number theory problem (as in the Diffie-Hellman and the Rivest Shamir Adleman (RSA) algorithms), or they rely on an unrealistic amount of trust.

In the case of RSA, the encryption function f(x) typically is $x^e$ mod n, where n is a publicly-known product of two large prime integers $P_1$ and $P_2$ (known only to the user who publishes n and e), and e (a publicly known exponent relatively prime with $P_1$ and $P_2$). In the RSA system, if a user X publishes two values e and n as above, then user Y can select a secret key k in an arbitrary manner and communicate it privately to X, by looking up X's publicized values, computing $k'=k^e$ mod n, and sending k' to X over a public network. If it is virtually impossible to calculate the $e^{th}$-root-modulo of a composite integer, the factorization of which is not known, then only user X will be able to retrieve k from k'; indeed, only X knows n's factorization (i.e., $P_1$ and $P_2$), and this knowledge makes extracting the $e^{th}$ root feasible, though not trivial.

In the case of the Diffie-Hellman scheme, the protocol has two system parameters p and g. They are both public and may be used by all the users in a system. Parameter p is a prime number and parameter g (usually called a generator) is an integer less than p, where for every number n between 1 and p-1 inclusive, there is a power k of g such that $n=g^k$ mod p.

Suppose Alice and Bob want to agree on a shared secret key using the Diffie-Hellman key agreement protocol. They proceed as follows: First, Alice generates a random private value a, and Bob generates a random private value b. Both a and b are drawn from the set of integers. Then they derive their public values using parameters p and g and their private values. Alice's public value is $g^a$ mod p and Bob's public value is $g^b$ mod p. They then exchange their public values. Finally, Alice computes $g^{ab}=(g^b)^a$ mod p, and Bob computes $g^{ba}=(g^a)^b$ mod p. Since $g^{ab}=g^{ba}=k$, Alice and Bob now have a shared secret key k.

The protocol depends on the Discrete Logarithm Problem for its security. It assumes that it is computationally infeasible to calculate the shared secret key $k=g^{ab}$ mod p given the two public values $g^a$ mod p and $g^b$ mod p when the prime p is sufficiently large. It has been shown that breaking the Diffie-Hellman protocol is equivalent to computing discrete logarithms under certain assumptions.

The Diffie-Hellman key exchange, however, is vulnerable to a man-in-the-middle attack. In this attack, an opponent Carol intercepts Alice's public value and sends her own public value to Bob. When Bob transmits his public value, Carol substitutes it with her own and sends it to Alice. Carol and Alice thus agree on one shared key and Carol and Bob agree on another shared key. After this exchange, Carol simply decrypts any messages sent out by Alice or Bob, and then reads and possibly modifies them before re-encrypting with the appropriate key and transmitting them to the other party. This vulnerability is present because Diffie-Hellman key exchange does not authenticate the participants.

For both the RSA and the Diffie-Hellman algorithms, the operations involved for secret-key exchange are quite time-consuming in software (computations of the type $a^b$ mod c are not-trivial whenever these values are large), or they require complex and expensive VLSI chips for fast modular exponentiation. Thus, building large-scale systems having efficient secret-key exchange using such techniques may require a great financial investment.

More importantly, the assumptions of the above secret-key exchange schemes to ensure security are very rigid. In the case of RSA, secret-key exchange is performed by means of an encryption function, $f(x)=x^e \mod n$, which possesses a secret (i.e., the factorization of n) that, if known, makes the inversion of f (i.e., computing x from f(x)) possible rather than practically impossible. While it is widely believed that one-way functions exist, fewer researchers believe that one-way functions possess this additional property. Similarly, in the case of Diffie-Hellman, $g^x \mod p$ not only needs to be one-way, but it should also possess additional algebraic and multiplicative properties. It is doubtful that one-way functions satisfying such additional algebraic constraints exist. Indeed, continuous algorithmic advances are being made that make factoring integers and solving the Discrete Logarithm Problem easier.

The methods described above do not provide a computationally efficient means to achieve secret-key exchange. Other algebraic secret-key exchange schemes have been devised by Blom and by Blundo et al., but these schemes rely upon an unrealistic amount of trust. In fact, not only do these schemes require a central authority that knows all the individual secret keys of the users, but also that all of the users in a large system are trustworthy. For instance, in Blom's case, as described in an article titled "An Optimal Class of Symmetric Key Generation Systems," *Advances in Cryptology: Proceedings of Eurocrypt* 84, *Lecture Notes in Computer Science*, Vol. 209, Springer-Verlag, Berlin, 1985, pp. 335-338, a trusted authority prepares and distributes keys to a group of n users. All these keys will remain secret, unless k of the users collaborate and reveal to each other the keys in their possession. If this happens, they can compute the secret keys of every other user in the system.

With such schemes, moreover, a few bad users may achieve the same results as a large number of bad users by forcing good users to surrender their secret keys. In other schemes forcing some users to reveal their keys may allow an enemy to understand at most the communications of those users (who will be aware of having lost privacy). In these algebraic schemes, however, an enemy who has forced a sufficient number of users to reveal their secret keys will understand the communications of all users, which is obviously unacceptable.

In another embodiment of the prior art, the RSA public key system may be used for secret-key exchange. Briefly, the RSA public key system defines a private key $s_{pr}$ and a public key $s_{pu}$. Private key $s_{pr}$ is used to sign messages, where the public key $s_{pu}$ may be used to verify the signature. Messages may then be transmitted securely with encryption using the public key, $E(message, s_{pu})$, where $E(x,y)$ is an encryption operation that encrypts a value x with a key y. The message may then be decrypted using the private key by computing $D(E(message, s_{pu}), s_{pr})$, where $D(x,y)$ is a decryption operation that decrypts a value x with a key y. Therefore, only the holder of the private key can decrypt documents encrypted with its corresponding public key. Accordingly, a user can create a private-public key pair $(s_{pr}, s_{pu})$ and make $s^{pu}$ public so that anyone can send encrypted documents securely to the user or verify the user's signature. Keeping $s_{pu}$ in a publicly available location presents a problem, however, in that a malicious user may replace $s_{pu}$ with its own public key $a_{pu}$, and perform a man-in-the-middle attack to intercept encrypted documents. Furthermore, RSA implementations are computationally expensive and may require a large hardware footprint (e.g., about 150 k gates for 512 bit RSA keys).

In summary, therefore, the prior art techniques described above are often inadequate for secret-key exchange systems to be used on resource-starved devices, such as CE devices, for example. As a result, it may not be feasible to secure communication links between service providers and compact electronic devices for the purpose of upgrading or, generally, communicating with the devices. The RSA and Diffie-Hellman cryptographic systems described above, for example, require expensive computing power in order to be implemented and may not be viable options for implementation in consumer or compact electronics.

Other systems have been developed that utilize a trusted authority to disseminate secret keys to members of a group that wish to communicate securely between each other. Such systems, however, may not be scalable. Additionally, an untrustworthy member may compromise such systems, if the member makes public the secret keys given to it by the trusted authority.

CE devices typically include a central processing unit (CPU), a memory and a memory management unit (MMU) that controls access to the memory. The device may also include long-term storage such as a disk drive or flash memory. A file system, managed by the OS, is created for data stored in the long-term storage. The MMU may also implement address mapping so that programs or data from the long-term storage may be transferred into the memory for execution or use. In a memory-mapped input/output (I/O) environment, the CPU accesses the data by sending commands to the long-term storage device as a peripheral device using an address and a command. The MMU then passes the command to the appropriate peripheral (i.e. the long-term storage device) based on the address which controls the transfer of data between the peripheral and the memory. Critical information for the CE device, such as the OS and encryption keys, are typically stored on the long-term storage device. In presently available systems, however, because transfers between the long-term storage device are not checked, it may be possible to corrupt this critical information.

SUMMARY OF THE INVENTION

The present invention is embodied in a system for securing the long-term storage of a device. The device has a memory including one or more areas of long-term storage, at least one of which is a secured long-term storage area. The device also includes a memory management unit for managing at least the secured long-term storage area of the memory and a security component for regulating access to at least the secured long-term storage area. The system includes dedicated circuitry that implements the security component which includes a memory security application that receives and authenticates a cryptographic authorization code that controls access to at least the secured long-term storage area and a controller for sending instructions from the memory security application to the memory management unit to enable writing into at least the secured long-term storage area of the memory if the security application authenticates the cryptographic authorization code.

According to one aspect of the invention, the long-term storage is protected by protecting a subset of the address space that is used to access the long-term storage Only after receiving appropriate authorization will the security hardware allow the MMU to grant write access.

A method of controlling access to a secured long-term storage of an electronic device, includes receiving data and a request to store the data in the secured long-term storage, receiving a cryptographic authorization code associated with the received data, authenticating the cryptographic authorization code and storing the data into the secured long-term storage if the cryptographic authorization code is authenticated.

According to one aspect of the invention, the method includes the steps of receiving a message digest of the update file, computing one or more of a hash value, a checksum and a cyclic redundancy check value for the update file, aborting the method if the message digest and the computed hash value, checksum or cyclic redundancy check value do not match, and continuing the method if the message digest and the computed hash value, checksum or cyclic redundancy check value do match.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Currently, a consumer electronic device may be secured from software based tampering and misuse only through the use of secured hardware components, as current operating systems do not provide adequate security measures. Additionally, due to the undesirable costs associated with device tampering (i.e., device failure or improper/undesirable functionality), it may be desirable to implement a high security method for firmware reconfiguration of reconfigurable hardware as well as updates to one or more of an operating system and security applications. Accordingly, various embodiments of the present invention may provide security of device upgrades and protection from device tampering through strong encryption, using dedicated hardware circuitry, of system critical software and data (e.g., operating system kernel, security applications, secret cryptographic keys, firmware configurations, etc.).

According to one embodiment of the invention, device upgrades may be distributed to the electronic devices through a secured transmission from a trusted authority and/or one or more authorized service providers. Although the establishment of channel and file download security is described below with respect to a Symmetric Algorithm Based Public Key System (S-PKS) scheme, those skilled in the art will recognize that other cryptographic algorithms including, without limitation, 3DES, the Advanced Encryption Standare (AES), and the Rivest, Shamir, Adleman (RSA) algorithm, for example, may be utilized without departing from the present invention.

An S-PKS, such as the one disclosed by Leighton and Micali in their patent entitled "Method for Enabling Users of a Cryptosystem to Generate and Use a Private Pair Key for Enciphering Communications between the Users", U.S. Pat. No. 5,519,778, may generally be initialized by a trusted authority and may comprise a plurality of users, each having an identifier and a secret key known only to the user. Any two users in such a system may initiate a secure connection by computing or obtaining a bi-directionally symmetric public key to negotiate a session key value, where each user has no knowledge of the other user's secret key. Once a session key has been negotiated, all further messages between the users may be encrypted using the session key. The communications medium may be any one of a wired local area network, a wireless local area network, a secure digital card, a portable storage device, an infrared channel, a satellite link, a fiber optic link, a cable link, a digital subscriber line, or the like.

According to one embodiment of the present invention, each group member 1, 2, 3, . . . and n may be identified by a respective identifier $\alpha_1, \alpha_2, \alpha_3, \ldots \alpha_n$ and may be given a respective secret key $s_1, s_2, s_3, \ldots s_n$ by the trusted authority. The trusted authority then computes a public key $p_{i,j}$ that may be used, as described below, to secure connections between any two users, $\alpha_i$ and $\alpha_j$ in the group. If, for example, $\alpha_i$ has secret key $s_i$ and $\alpha_j$ having secret key $s_j$, the public key may be computed according to equation (1):

$$p_{i,j} = E(\alpha_i, s_j) \oplus E(\alpha_j, s_i) \tag{1}$$

Where E(x,y) is an encryption operation (e.g., a block cipher or a keyed one-way hash function) that encrypts an input value x with a cryptographic key value y, and $\oplus$ is the Exclusive-OR operation. Those skilled in the art will recognize that such a method allows the use of symmetric algorithms in place of asymmetric algorithms, while supporting an asymmetric public key infrastructure. Accordingly, fast cryptographic algorithms such as block ciphers, for example, may be utilized for encryption operations, thereby using few resources in both hardware circuitry and software.

Figure 1:
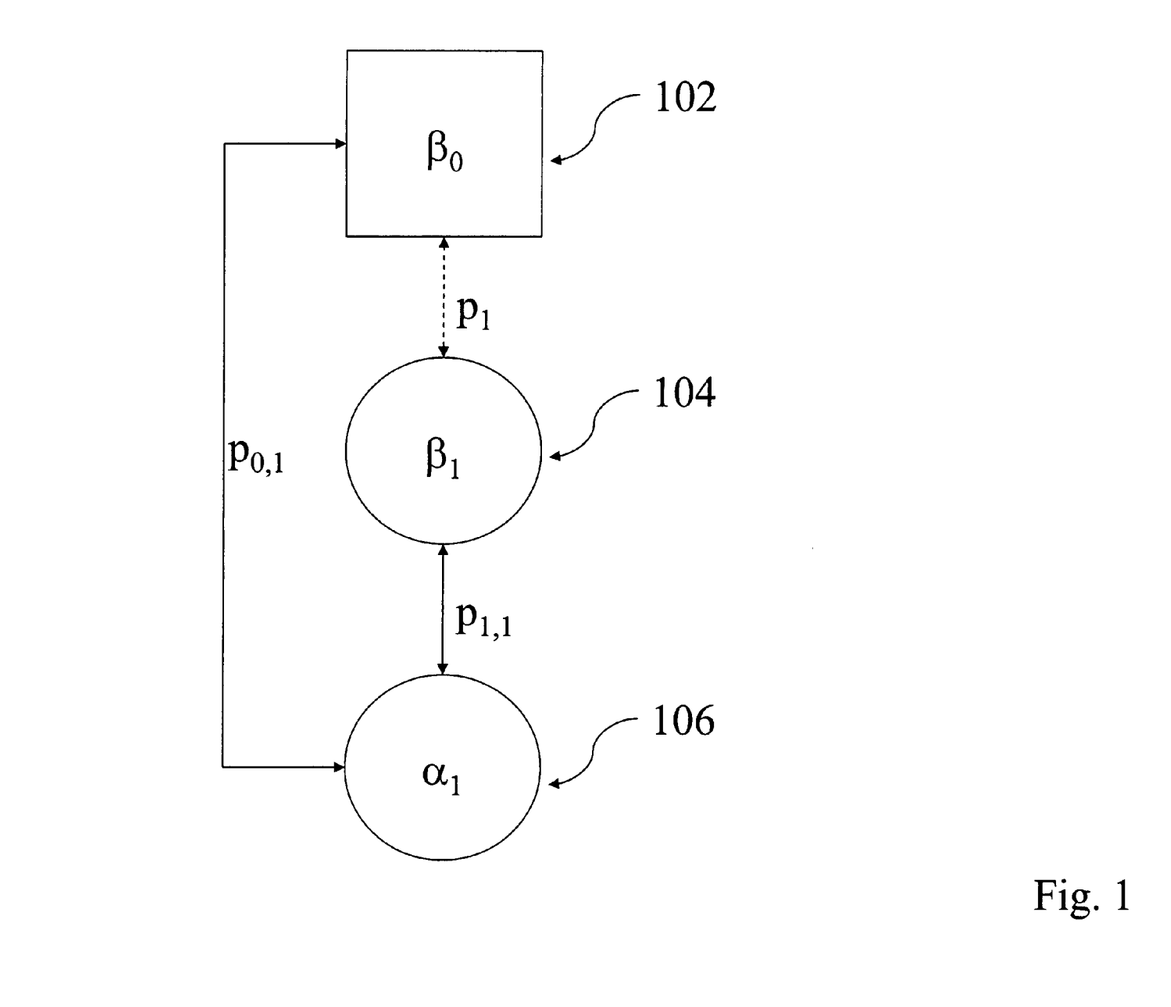
FIG. 1 is a is a block diagram of a system or network in accordance with the present invention.

Referring now to the drawing, in which like reference numbers refer to like elements throughout the various figures that comprise the drawing, FIG. 1 is a block diagram illustrating one embodiment of the present invention as a public key cryptography system comprising a trusted authority 102 having a trusted authority identifier $\beta_0$ and a trusted authority secret key $t_0$ (not shown in FIG. 1), a service provider 104 having a service provider identifier $\beta_1$ and a service provider secret key $t_1$ (not shown in FIG. 1), and a client 106 having a client identifier $\alpha_1$ and a client secret key $s_1$ (not shown in FIG. 1).

In the exemplary embodiment, trusted authority 102 initializes the public key cryptography system, which may include generating and securely providing service provider 104 with the service provider identifier $\beta_1$ and the service provider secret key $t_1$, and client 106 with the client identifier $\alpha_1$ and the client secret key $s_1$.

Trusted authority 102 may also generate and make available public key values for securing communications between the service provider and the client, as described above. The public key values may be stored in a public key table, or may be generated on demand by sending a request to the trusted authority. Accordingly, trusted authority 102 may secure communications with client 106 using public key $p_{0,1}$, as described below. Additionally, service provider 104 may secure communications with client 106 using public key $p_{1,1}$. In one embodiment of the invention, it may also be desirable to provide a public key $p_1$ to use in securing communications between service provider 104 and trusted authority 102. According to this embodiment, the trusted authority may distribute device upgrades to the service provider, and the service provider may then distribute the device upgrades to the one or more clients for which it is responsible.

Trusted authority 102 may take appropriate measures to provide a desirable level of security in distributing the secret keys of the client and service provider. This may include, for example, physically transporting the secret key data to the individual clients and service providers. Those skilled in the art will recognize that there are many methods of secret key distribution that may be used to provide various desirable levels of security without departing from the present invention.

In the exemplary embodiment illustrated in FIG. 1, service provider 104 may securely distribute software and device upgrades to client 106 after negotiating a session key with client 106 using public key $p_{1,1}$. In a further embodiment, a plurality of service providers may be provided to distribute software and device upgrades to a plurality of clients. Software and device upgrades may include, for example, updates, fixes, and/or service packs for firmware, middleware, device drivers, application software, and the like.

In one embodiment of the present invention, the trusted authority may be the manufacturer of a large number of electronic devices (i.e., clients) that may contain device drivers and application software, for example. The manufacturer, acting as a lone trusted authority, may not be able to afford the resources necessary to provide the large number of electronic devices with necessary device upgrades in a timely fashion. Consequently, it may be desirable for the manufacturer to give each one of a plurality of $3^{rd}$ party service providers the authority to provide upgrades to at least some of the large number of electronic devices by providing each service provider with a secret key, and generating public key values as described above to allow the providers to secure communications with the devices, as described below.

Figure 2:
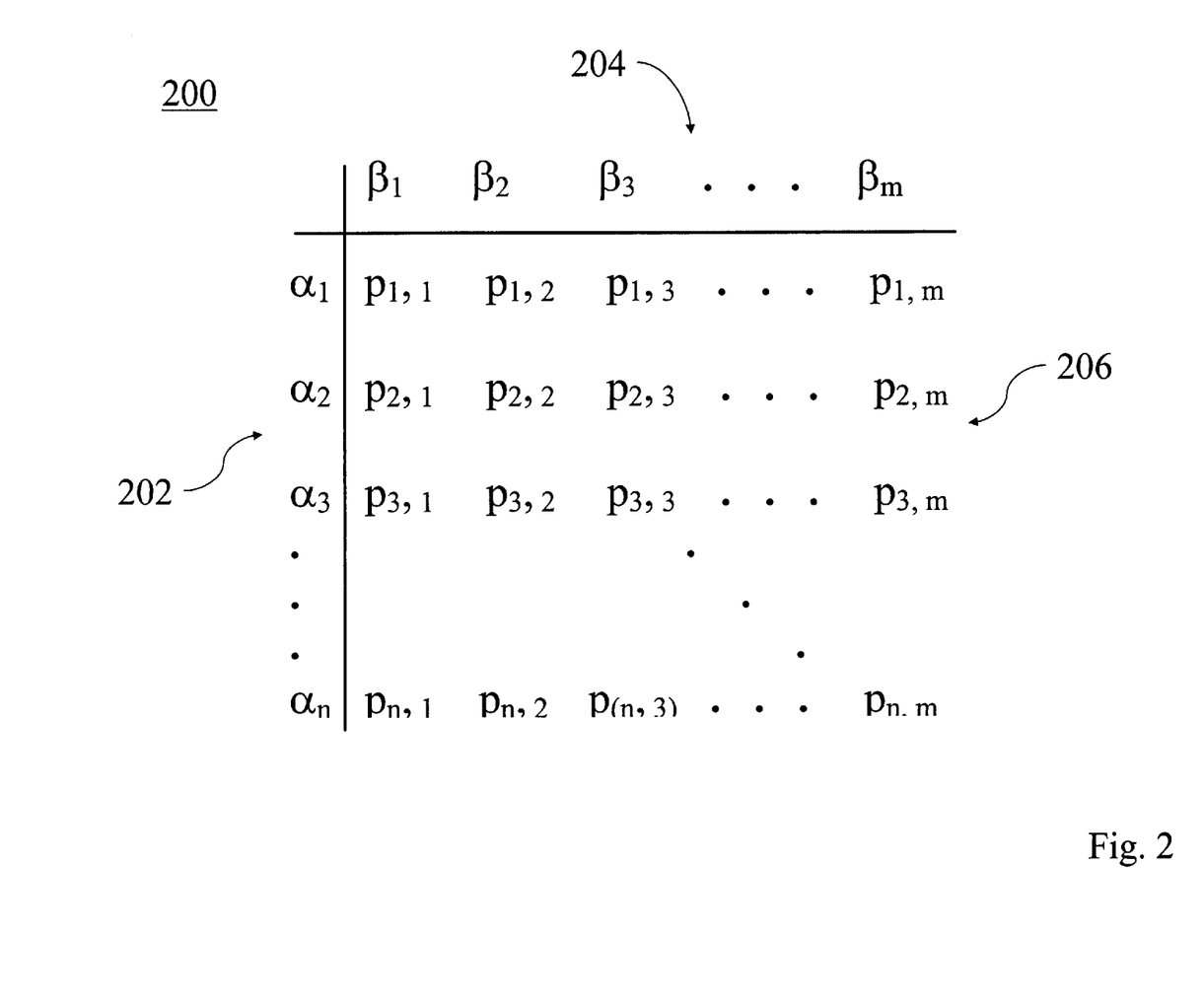
FIG. 2 is a public key table in accordance with the present invention.

FIG. 2 illustrates an exemplary global public key table 200 containing public keys 206 described above. Accordingly, public key table 200 contains service provider identifiers $\beta_1$, $\beta_2$, $\beta_3$, ... $\beta_m$ arranged as column headers 204, and client identifiers $\alpha_1$, $\alpha_2$, $\alpha_3$, ... $\alpha_n$ arranged as row headers 202. Furthermore, public keys $p_{1,1}, p_{2,1}, p_{3,1}, \ldots p_{n,1}$ are provided for use in securing communications between a first service provider $\beta_1$ and clients $\alpha_1$ through $\alpha_n$, as described below. The remaining public keys shown are provided for use in securing communications between the remaining service providers $\beta_2$ through $\beta_m$ and clients $\alpha_1$ through $\alpha_n$. The public key table may be managed and made available by a trusted authority. In another embodiment, the trusted authority may be destroyed after setting up the system and the public key table may be made available in a tamper-proof location. In such an embodiment, the public key table further includes authentication data for each of the public key values, thereby allowing every client and service provider to independently authenticate the public key values (so as to guard against man-in-the-middle type attacks).

Alternately, each service provider or client may be given an individual public key table containing a list of client or service provider identifiers, respectively, and associated public key values, as described above (e.g., service provider $\beta_1$ is provided with client identifiers $\alpha_1 \ldots \alpha_n$ and corresponding public keys $p_{1,1} \ldots p_{n,1}$, and/or client $\alpha_1$ is provided with service provider identifiers $\beta_1 \ldots \beta_m$ and corresponding public keys $p_{1,1} \ldots p_{1,m}$). This would correspond to each client receiving a respective row of table 200 in FIG. 2 (e.g., client $\alpha_1$ receiving row 1), and each service provider receiving a respective column (e.g., service provider $\beta_1$ receiving column 1). Accordingly, the service provider or client may use its own individual public key table without having to refer to a global public key table or send a request to the trusted authority for a public key value. Further, if the service provider has its own individual public key table and the client does not, or vice versa, then the client may ask the service provider to provide the public key.

In another embodiment of the invention, a further maintenance task of the trusted authority may include securely retiring and upgrading client private key values. In one embodiment, the trusted authority may provide each client with a second secret key value that may be used solely for initiating secure connections with the trusted authority (or an authorized service provider, if desirable) to retire and replace the private key value. The second key value may be longer than the private key value and may use an alternative keyed hash function for added security. The second key value is desirably cryptographically stronger, and the added computational costs may be acceptable, as client key upgrade operations may occur less often than other client upgrades. Accordingly, once a secure connection is negotiated between the trusted authority and a client using the second key value, the trusted authority may transmit the new private key value to the client in addition to a command (or cryptographic authorization) to delete the old private key value and replace it with the new one.

In an alternate embodiment, the trusted authority may preclude the implementation of a second key value and provide key upgrades described above through a connection secured using the client's old private key value. Such an embodiment may fail to curb the actions of a malicious user that is in control of the old client key, because the malicious user may use the old client key to obtain the new client key. However, such an embodiment does not introduce the additional overhead associated with the addition of a second secret key value, and may be desirable for typically often-occurring client security upgrades, or where the trusted authority is reasonably certain that the client's old private key value has not been compromised.

According to the present invention, a service provider having a service provider identifier $\beta_1$ and secret key $t_1$ may contact and subsequently attempt to initiate a secure connection with a client having a client identifier $\alpha_1$ and a client secret key $s_1$, wherein the secure connection may be used to transmit secured upgrades to the client once the secure connection is established. Alternately, the client may transmit a request for upgrades to the service provider, whereby the service provider may then attempt to initiate a secure connection with the client. Those skilled in the art will recognize that the trusted authority may be considered as a service provider, but may have additional control over the system (such as described above with respect to private key upgrades).

In order to initiate a secure connection, a public key corresponding to the client and service provider secret keys is obtained. Accordingly, the service provider obtains a symmetric public key $p_{1,1}$ corresponding to its pairing with the client. The public key may be obtained from a global public key table, on demand from a trusted authority, through a transmission from the client, or from a locally stored individual public key table, for example. Furthermore, the public key may be calculated by the trusted authority according to equation (2):

$$p_{1,1} = E(\alpha_1, t_1) \oplus E(\beta_1, s_1), \quad (2)$$

where E(x,y) is an encryption operation (e.g., a block-cipher or a keyed one-way hash function, for example) that encrypts the value x with a key value y. The public key value above may be calculated and stored in a global public key table administered by a trusted authority, calculated and transmitted on demand by the trusted authority, or stored in a local memory of the client and/or the service provider.

The service provider may then identify itself to the client by transmitting service provider identifier $\beta_1$ in addition to a random variable X that may be used as a session key (i.e., to encrypt session traffic between the service provider and the client). The random variable X is encrypted prior to transmission, according to expression (3):

$$E(X, p_{1,1} \oplus E(\alpha_1, t_1)) \quad (3)$$

Alternately, a single transmission may be sent including information on both the service provider identifier and the session key according to expression (4):

$$E(\beta_1 \oplus X, p_{1,1} \oplus E(\alpha_1, t_1)) \quad (4)$$

Additionally, the service provider may authenticate itself to the client by transmitting an encrypted value such as is shown in expression (5):

$$p_{1,1} \oplus E(a_1, t_1) \quad (5)$$

The client may receive the encrypted value and may proceed to authenticate the service provider by obtaining the service provider identifier from the encrypted value according to equations (6) and (7).

$$p_{1,1} \oplus E(\alpha_1, t_1) = E(\beta_1, s_1) \quad (6)$$

$$E^{-1}(E(\beta_1, s_1), s_1) = \beta_1 \quad (7)$$

If the expected identifier is not found from the above calculations, then the service provider is not authenticated. The client may be reasonably certain of the validity of P1,1 as it may have been obtained through a secured encrypted transfer from the trusted authority, from a public key table with authenticating data, or installed in the client at the time of manufacture.

In an alternate embodiment of the present invention, it may be desirable (for added security) to destroy the trusted authority once the system has been properly set up (i.e., all public and private keys for the clients and service providers have been created and substantially distributed). In such an embodiment, it is important that the public key table(s) be kept in a highly secure location so as to guard against man-in-the-middle attacks (where a hacker would replace public key values with its own public keys). Alternately, the public key value may be kept in tamper-proof location, but additional precautions may be taken to ensure the authenticity of the public key value. Accordingly, every service provider in the cryptographic system may be provided with two secret key values $t_j$ and $b_j$, and every client in the cryptographic system may be provided with two secret key values $s_i$ and $c_i$. The additional key values $b_j$ and $c_i$ may be considered as a service provider authentication key and a client authentication key, respectively. Furthermore, there are now three public key values associated with each pairing of a service provider and at least one client. The three public key values include the original $p_{i,j}$, described above, in addition to a client authentication public key value $E(E(\alpha_i, t_j), c_i)$ and a service provider authentication public key value $E(E(\beta_j, s_i), b_j)$.

In order for a client to authenticate the public key value $p_{i,j}$, the client first obtains public key values $p_{i,j}$ and $E(E(\alpha_i, t_j)c_i)$. The public key values may be obtained as previously described.

The client then computes equation (7):

$$\textcircled{2} = p_{i,j} \oplus E(\beta_j, s_i) = E(\alpha_i, t_j) \quad (7)$$

And equation (8)

$$\textcircled{3} = E^{-1}(E(E(\alpha_i, t_j), c_i), c_i) = E(\alpha_i, t_j) \quad (8)$$

The client will then compare ② and ③ and determine whether they are equivalent. If they are, then the client may safely conclude that public key value $p_{i,j}$ is valid and may be used to secure a connection with the corresponding service provider. If the two values are not equivalent, then the client concludes that the public key value $p_{i,j}$ is invalid.

Similarly, a service provider may authenticate public key value $p_{i,j}$ by obtaining public key values $p_{i,j}$ and $E(E(\beta_j, s_i), b_j)$, and computing equation (9):

$$\textcircled{2} = p_{i,j} \oplus E(\alpha_i, t_j) = E(\beta_j, s_i) \quad (9)$$

And equation (10)

$$\textcircled{3} = E^{-1}(E(E(\beta_j, s_i), b_j), b_j) = E(\beta_j, s_i) \quad (10)$$

If the service provider determines that the values computed for ② and ③ are equivalent, then it may concludes that public key value $p_{i,j}$ is valid and may be used to secure a connection with the corresponding client. If the two values are not equivalent, then the service provider concludes that the public key value $p_{i,j}$ is invalid.

Either before or after authenticating the service provider (or public key value, if applicable), the client may access a list of unauthorized service providers (i.e., a black list) to see if it contains the service provider identifier $\beta_1$. In one embodiment, the client may transmit a secure request to a trusted authority for verification of the service provider as being an authorized or acceptable service provider. Alternately, the trusted authority may periodically notify the client of compromised or unacceptable service providers, whereby the client may add the compromised service providers to the black list. In another embodiment, the client may access a list of authorized service providers (i.e., a white list) to see if it contains the service provider identifier $\beta_1$, whereby compromised service providers may be removed from the white list in a similar manner as being added to a black list, described above.

In communicating with a client, the trusted authority knows the client secret key $s_1$, and may therefore pass a random session key to the client, thereafter encrypting transmissions to the client using the random session key and allowing the client to easily decrypt the transmissions. Alternately, the trusted authority may encrypt transmissions to the client according to the current embodiment of the invention being discussed.

If the service provider is identified as being a compromised service provider, the client may ignore future communications from the service provider and terminate current communications with the service provider. If the service provider is an acceptable service provider, however, the client may continue to obtain the session key by decrypting the encrypted transmission through equations (11) and (12):

$$E(X, p_{1,1} \oplus E(\alpha_1, t_1)) = E(X, E(\beta_1, s_1)) \quad (11)$$

$$E^{-1}(E(X, E(\beta_1, s_1)), E(\beta_1, s_1)) = X \quad (12)$$

Once the random variable session key X is obtained, a secure session may be established, and all further messages between the service provider and the client may be encrypted as E(message,X). Alternately, the client may first be required to authenticate itself to the service provider once it has obtained the session key X by transmitting the value defined by expression (13):

$$E(p_{1,1} \oplus E(\beta_1, s_1), X) \quad (13)$$

The service provider may receive the above transmission and simplify it as expression (14):

$$E(E(\alpha_1, t_1), X) \quad (14)$$

Because the service provider has knowledge of the values X and $t_1$, it is able to authenticate the client by performing two decryption operations on the above simplified transmission to obtain $\alpha_1$; if $\alpha_1$ is not obtained, the client is not authenticated. Once the session key has been negotiated, as described above, the service provider may encrypt session traffic—which may include upgrade packages, code and commands, for example (i.e., payload files)—with session key X and securely transmit to the client.

Furthermore, the service provider may use a hash function on the payload files to generate a hash value h bits long, where, in one embodiment, $\log_2(h)$ may be 128-256 bits. The client may then authenticate the payload files by computing the hash function on the received payload files and comparing the obtained hash value with the hash value sent by the service provider. If the hash values match, then the payload files are authenticated and may be decrypted and executed/installed. If the hash values do not match, then the client may request that the service provider re-send the payload files along with a new hash value, or the upgrade may be aborted altogether. Alternately, the same payload authentication procedure described above may be performed with a checksum or a cyclic redundancy check (CRC) computation instead of the hash computation.

Figure 3:
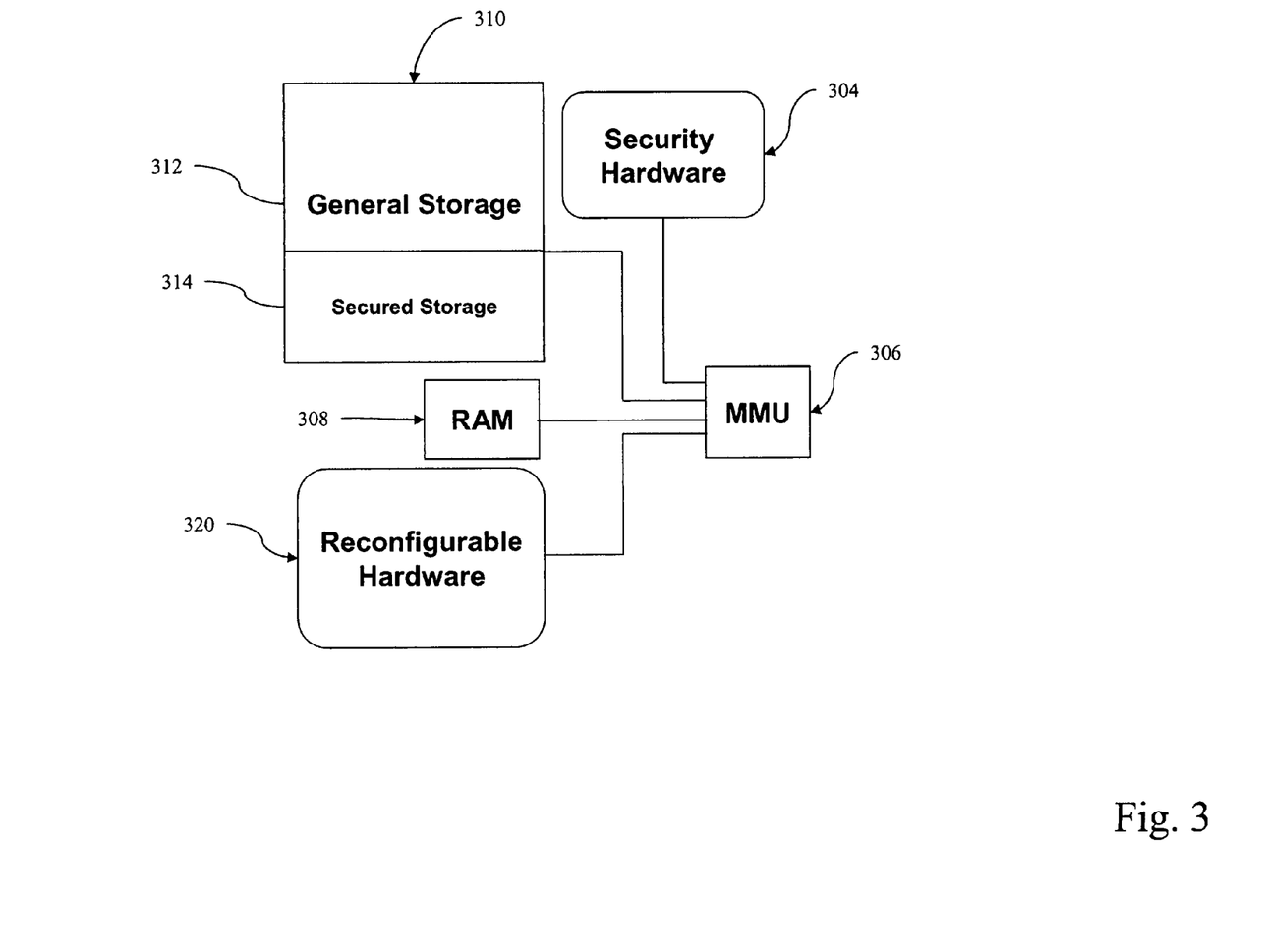
FIG. 3 is a block diagram of selected components of a compact electronic device according to an embodiment of the present invention.

With respect to the client device, one embodiment of the invention is illustrated in FIG. 3, which is a block diagram illustrating selected components of a client device and system for securing long-term storage, according to one embodiment of the present invention. As shown, long term storage 310 is partitioned into general storage 312 and secured storage 314. The secured storage 314 area is partitioned under control of security hardware 304, which may instruct memory management unit (MMU) 306 to set flags in long term storage 310 designating secured storage 314 as "read-only". In a further embodiment, the system may also include temporary storage 308, such as a random access memory (RAM), as well as reconfigurable hardware circuitry 320. Although the security hardware is shown as separate circuitry, it is contemplated that it may also be integrated into the MMU or CPU of the exemplary CE device.

All data contained within secured storage 314, therefore, may not be overwritten or changed, unless a valid cryptographic authorization (CA) code is received by security hardware 304 that allows selected data to be written to secured storage 314, possibly overwriting any outdated data already within secured storage 314. Such data may include an operating system kernel, one or more security applications, one or more firmware configurations, and any other desirably secure data. In a further embodiment, a second secured storage (not shown in FIG. 3) may be partitioned from long-term storage 310 for the storage of sensitive security data such as one or more secret key values and one or more checksum, CRC and/or hash values of data stored within secured storage 314. While one or more $3^{rd}$ party service providers may send reconfiguration data or device upgrade data to secured storage 314 with a proper CA code (provided by a trusted authority), it may be desirable to reserve access to the second secured storage portion to only a trusted authority. In one embodiment, the trusted authority may be the manufacturer of the client device, which may desire exclusive control over upgrades to the security components of the client device.

Accordingly, a general security component of one embodiment of the present invention may include security hardware circuitry 304 for partitioning and controlling access to secured storage 314 portions of long-term storage 310 and for instructing MMU 306 to regulate access to secured storage 314, under control of one or more security applications. A data security application may be used for receiving (i.e., forming a secure channel with a service provider, such as an S-PKS connection described above, and saving files to temporary storage 308), validating (i.e., authenticating files with at least a checksum, CRC or hash value computation), and saving (i.e., by activating secured storage 314 to allow files to be written to long-term storage 310 from temporary storage 308) secure updates and firmware reconfigurations for reconfigurable hardware (e.g., a software defined radio, an audio/video converter and/or a cryptography circuit), for example. A memory security application may be used for activating secured storage 314 and allowing access to files for execution (i.e., installation) or in a read-only mode. The general security component may even include its own long-term storage (not shown in FIG. 3) separate from long term storage 310, in which sensitive data such as secret keys and checksum/CRC/hash values may be stored (described above).

Figure 4:
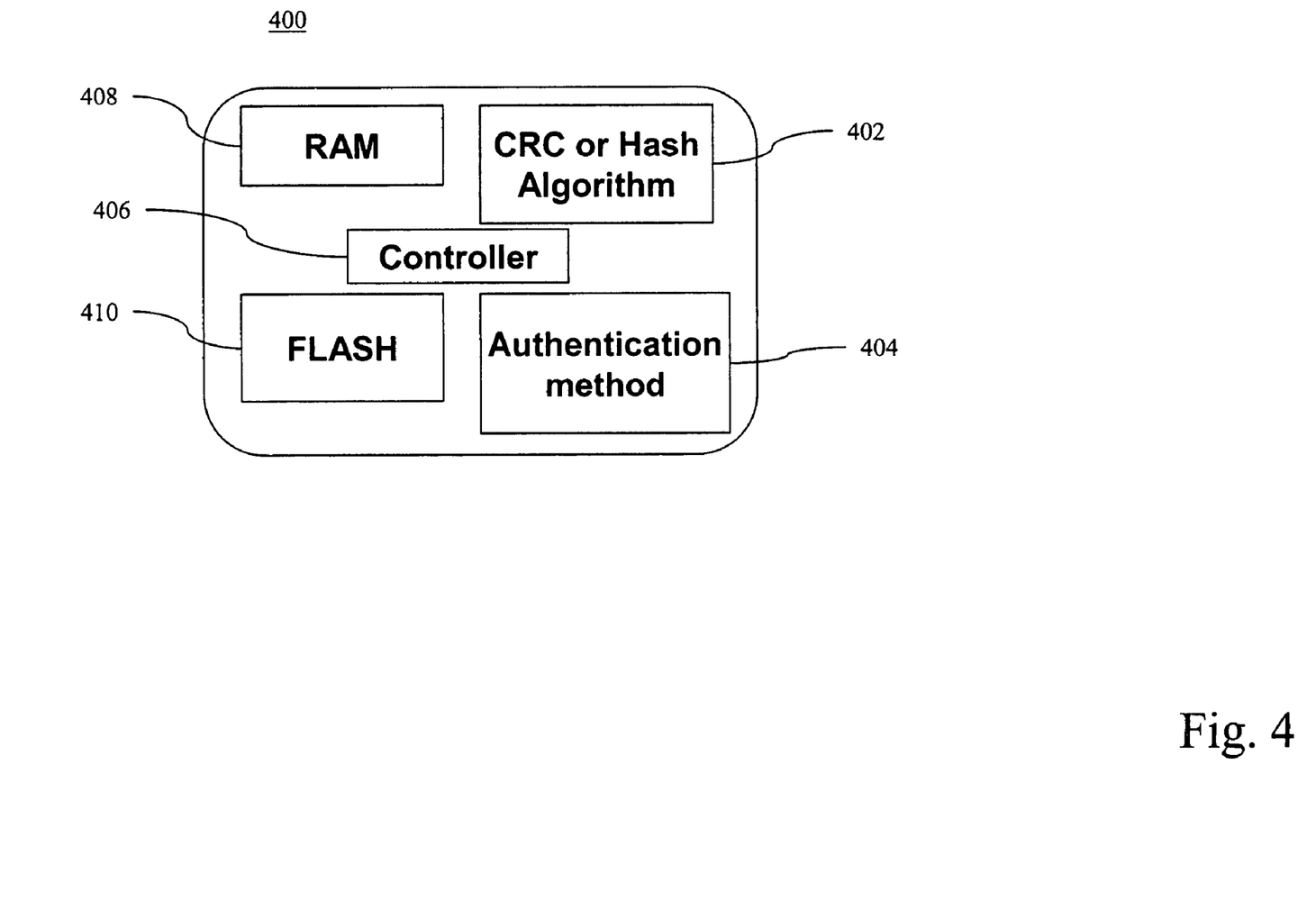
FIG. 4 is a block diagram of selected components of security hardware according to the present invention.

FIG. 4 is a block diagram of exemplary security hardware 400. In one embodiment, security hardware 400 may include temporary storage 408 (e.g., RAM), long-term storage 410 (e.g., Flash memory), and controller 406 for implementing a checksum, CRC and/or hash algorithm 402 and a security/authentication method 404 such as an S-PKS described previously. Furthermore, security hardware 400 may be contained in a substantially tamperproof circuit. As described below, the security hardware 400 secures a designated subset of the address space. No entity can perform protected operations (i.e. writing) to the protected portion of the address space until proper authorization has been achieved.

In one embodiment of the invention, the secured storage system described above may be utilized to ensure the integrity of data during initialization of an electronic device, such as during device boot up or program execution. This is to ensure the integrity of sensitive programs and data so that the device does not initialize or execute a version of software that has been undesirably altered by a user, by a hacker, or through data corruption.

Figure 5:
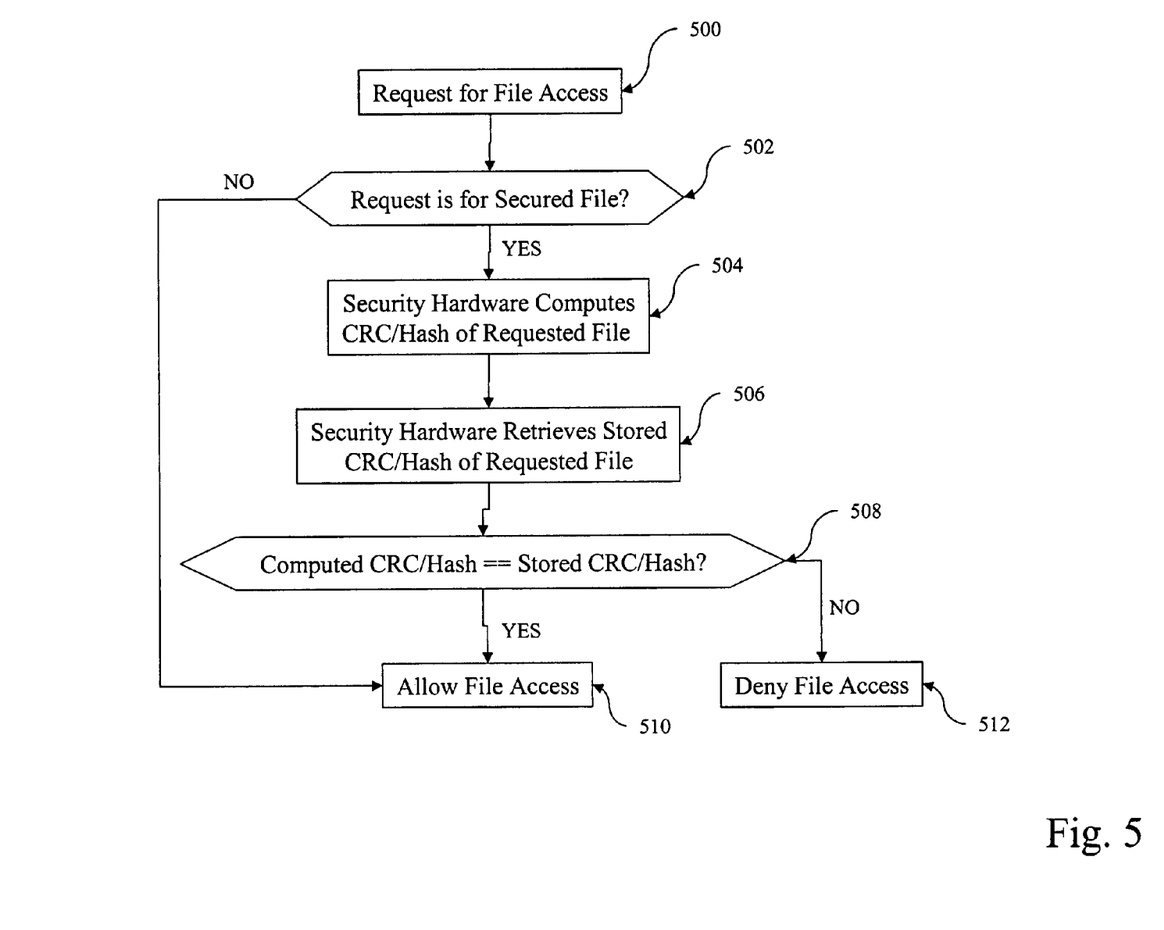
FIG. 5 is a flowchart diagram illustrating a method of accessing a secured storage, according to the present invention.

One method of accessing the secured long-term storage of the electronic device is illustrated in the flowchart of FIG. 5. Starting with step 500, a request for file access is received, whereby the system (or an application therein) requests access to data stored in the secured long-term storage. Such requests may be sent to the MMU on boot up, for example, whereby the MMU determines in step 502 whether the request is for secured data, and forwards the request to the memory security application, if it is. If the request is not for secure data, then access is immediately granted.

Alternately, requests for secured data may be sent directly to the security hardware, which handles the requests through the memory security application. In this embodiment, the memory security application may allow or deny read-only access to requested addresses based on predetermined policies that grant or restrict read-only access by certain applications to certain secured files. In another embodiment, the data security application may require that cryptographic authorization code be sent with each read-only request to secured storage, where a single code may allow universal read-only access to secured storage or a plurality of codes may allow read-only access to selected portions of secured storage. Accordingly, on receiving a request, the memory security application may verify read-only access based on the received code, and forward the appropriate request prior to step 504, whereby the security hardware will instruct the MMU to allow access to the desired portions of secured storage.

On receiving a request, the security hardware, under control of the memory security application, may compute a checksum, CRC and/or hash value of the requested file in step 504, according to a predetermined algorithm. Either in succession or simultaneous to step 504, the security hardware may retrieve a stored checksum/CRC/hash value of the requested file (i.e., a message digest) in step 506. The message digest may be retrieved from secured storage or from a second secured storage, as described previously. In step 508, the security hardware confirms the integrity of the requested file by comparing the message digest to the computed checksum/CRC/hash value in order to determine if they are equivalent. If the two values are equivalent, then the file is valid and access is allowed in step 510. If the values are not equivalent, then the file lacks integrity and access is denied in step 512. For this feature of the invention to operate properly, it is desirable for some initial information to be passed to the security hardware. This information may, for example, be an identifier for the file and notification that the next commands will be fetching the appropriate data from the storage system. In the exemplary embodiment, the security hardware knows the size of the file and can compute the appropriate checksum/CRC/hash etc. as the file is being fetched. If the computed value does not match the stored value a error code is placed on the bus that will cause an interrupt (or some other immediate action) so that the OS can act on possible corruption of the file.

Depending on the preferred policy, files that are found to lack integrity at the end of the above process may be designated as compromised and the user of the device and/or a trusted authority may be notified for action. In further embodiments, all further requests for the compromised file may be denied, the compromised file may be deleted or placed in a quarantine area of the long term storage, and/or a request may be sent for a backup copy of the compromised file-which may be downloaded according to the method below and saved over the compromised file.

Figure 6:
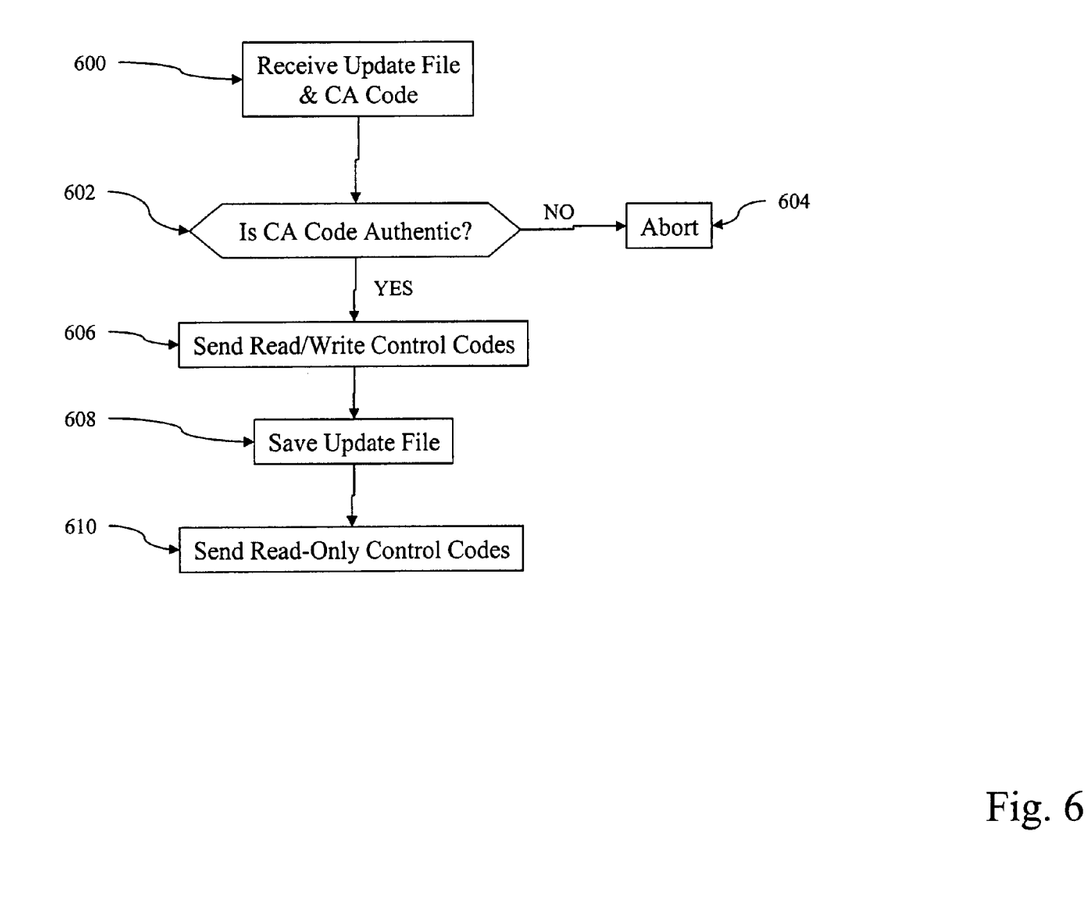
FIG. 6 is a flowchart diagram illustrating a method of saving data to a secured storage, according to the present invention.

FIG. 6 is a flowchart illustrating a further embodiment of the present invention as a method of saving data to a secured long-term storage. The process begins at step 600 with reception of an update file and a CA code. The reception of these files may be through a secured channel, as described previously. Accordingly, the files may be decrypted by security hardware, under control of the data security application, if necessary. In step 602, the CA code is authenticated using a predetermined cryptographic algorithm such as 3DES, AES, RSA, or S-PKS (e.g., using a keyed one-way hash). If the authorization code cannot be authenticated, then the save is aborted and the update file is discarded in step 604. If the code is authenticated, then the process proceeds to step 606 where the security hardware, under control of the data security application, sends control codes to the MMU, which thereby changes secured long-term storage from "read-only" mode to "read/write" mode. In step 608, the update file is written to secured long-term storage, possibly overwriting an older version of the file. After the file has been written, the security hardware, in step 610, sends further control codes to the MMU to make the secured long-term storage "read-only" again. Those skilled in the art will recognize that the MMU may be instructed so as not to allow access to the entire secured storage but only to selected portions corresponding to the address space that is being accessed.

In a further embodiment, a message digest may be received along with the update file and the CA code. Accordingly, the security hardware, under control of the data security application, may authenticate the update file by computing a checksum/CRC/hash value of the update file and comparing with the message digest. If the message digest and the computed checksum/CRC/hash value do not match, the update file may be discarded and the process aborted, whereas the process may continue if the two values are substantially equivalent. Furthermore, the message digest for a properly authenticated update file may be written to a second secured long-term storage area, as described above, whereby the appropriate control codes are transmitted to the MMU to change the second secured long-term storage area to a "read/write" mode and further control codes are transmitted to make the storage "read-only" once the message digest has been written. In an alternative embodiment, the second portion of the secured address space may be implemented such that it may be accessed only by the security hardware.

Furthermore, download information such as the identifier of the service provider (or trusted authority) that transmitted the update file may be saved in addition to a separate unique identifier (provided by the trusted authority, the service provider, or randomly generated by the client itself) for the update file and any other desirable update statistics/information such as the time and date of download/installation, for example. These data may be logged in either the general long-term storage or, desirably, the secured long-term storage.

Those skilled in the art will recognize that the CA code described above may be omitted in an embodiment of the invention that utilizes the previously described S-PKS method of securing downloads. In such an embodiment, authorization may be implicit in the formation of the channel with a service provider having a certain service provider identifier, thereby obviating the need for an additional authorization code, unless such an added dimension of security is desirable (such as to restrict the types of updates a certain service provider may provide to clients).

For example, a client may be provided with information on which service providers are authorized to provide certain upgrades. Accordingly, when a particular service provider is authenticated through an S-PKS connection, for example, the client may accept upgrades of the type for which the particular service provider is authorized, based on the client's information. Nevertheless, a trusted authority may wish to authorize various service providers for certain upgrades on an ad-hoc basis, thereby adding undesirable overhead in regularly updating the client's information. In such an embodiment, therefore, it may be desirable to require a CA code for each upgrade, thereby indicating, to a client, a service provider's authorization to provide the upgrade.

Accordingly, a method of saving data to a first secured long-term storage in an alternate embodiment of the present invention may include the steps of receiving a transmission from a service provider including a service provider identifier and an encrypted session key. The client may then request authentication of the service provider from a trusted authority so as to make sure the service provider hasn't been compromised (i.e., added to a black list by the trusted authority). The client receives the authentication information from the trusted authority and aborts the method if the service provider authenticates negatively and continues the method if the service provider authenticates positively. If the service provider is authenticated, the client will then obtain a public key for decrypting at least a portion of the transmission from the service provider to recover the session key according to the S-PKS method described above, for example. Once the session key is recovered, the client may secure a communications channel to the service provider with the session key and receive an update file, a message digest of the update file, and a CA code (if desirable) from the service provider through the secured communications channel. Alternately, the CA code may be omitted if the client already has information on whether the service provider is authorized to provide the update file, as described above.

After receiving these files, the client may authenticate the file by computing one or more of a checksum, a hash value or a CRC value for the update file, and aborting the method if the message digest and the computed checksum, hash value and/or CRC value do not match. If the values match, then the client continues the method by sending control codes to the MMU, instructing the unit to allow the update to be written into at least the first secured long-, and possibly to a second secured long-term storage area, if necessary (such as when saving a message digest of an update file, or when receiving a new private key value from a trusted authority). The client may then write the update file to the first secured long-term storage and the message digest to the second secured long-term storage (if a second secured-term storage is used), and send control codes to the MMU, instructing the unit to make at least the first and, if used, the second secured long-term storage "read-only" again.

In one embodiment of the invention, the first and second long-term storage may be different areas of the same long-term storage device (e.g., flash memory). Alternately, they may be contained on two separate long-term storage devices. It is contemplated that the secured long-term areas of storage may also extend onto a plurality of storage devices (such as when data are larger than the native memory of the client, necessitating the installation of additional memory or a removable storage device) without departing from the present invention.

Figure 7:
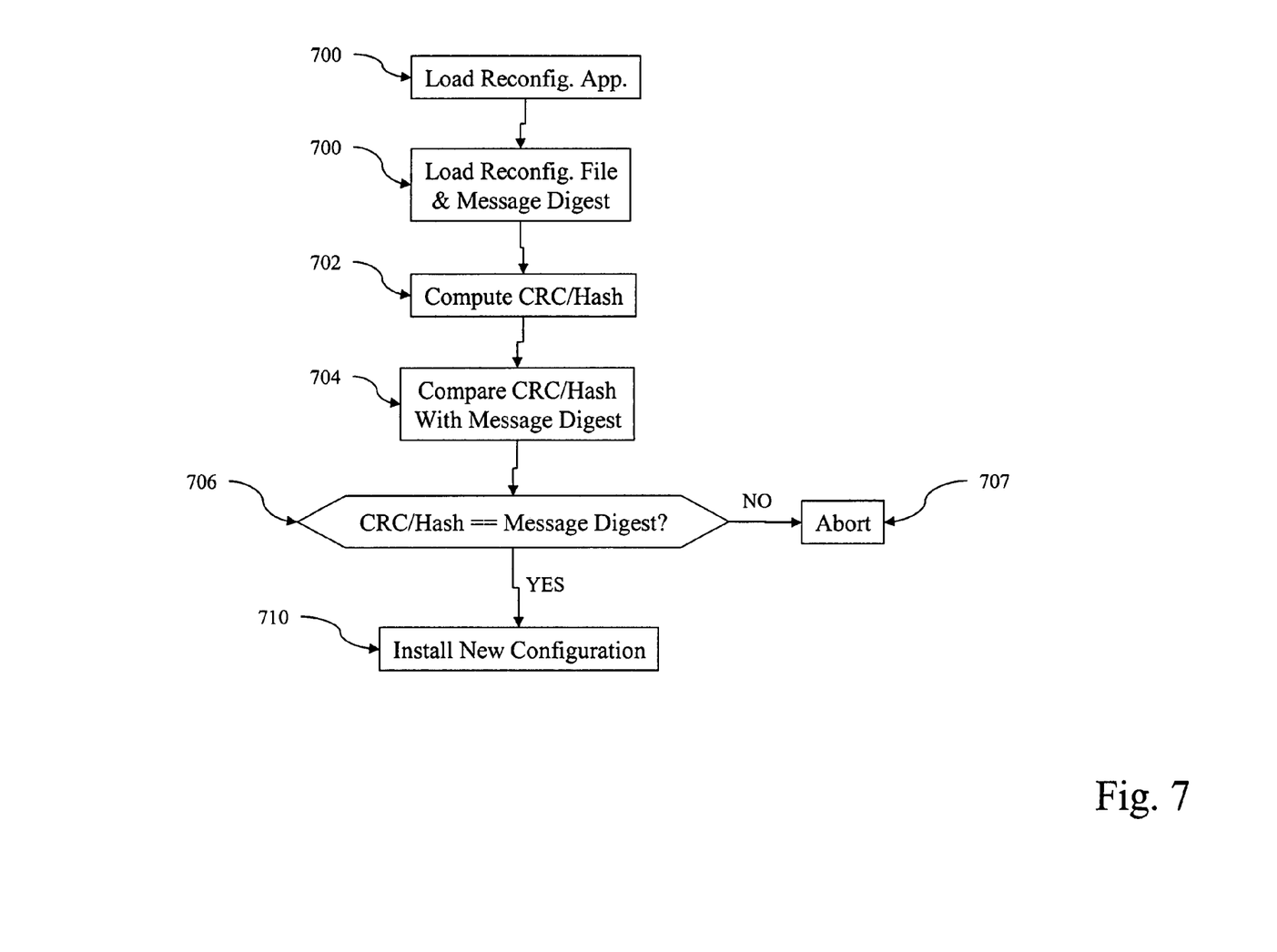
FIG. 7 is a flowchart diagram illustrating a method of loading a new configuration from a secured storage for reconfigurable hardware or software, according to the present invention.

Once an update file has been authenticated and is saved to secured storage as described above, the next step is to install or initialize the update. FIG. 7 is a flowchart illustrating a method of updating the configuration and/or files of reconfigurable hardware or software of an electronic device according to an embodiment of the present invention. The process begins with step 700, which loads a reconfiguration application (e.g., the memory security application), in addition to the new configuration file to be installed and the message digest of the new configuration file. The new configuration file and the message digest thereof may be loaded from the same or different secured long-term storage devices. Step 702 computes a checksum, hash value and/or a CRC value of the new configuration file. Step 704 then compares this computed checksum/CRC/hash value with the message digest. If, in step 706, the message digest and the computed checksum/CRC/hash value do not match, the update process is aborted in step 707. Otherwise, the process continues to step 710 whereby the update file is installed and the reconfigurable hardware or software is updated by executing the file. Not shown in FIG. 7 are a number of steps that may be performed subsequent to the installation of the upgrade, such as logging the installation information, archiving the update file, deleting the update file, and/or transmitting installation confirmation to a service provider or trusted authority, for example.

Figure 8:
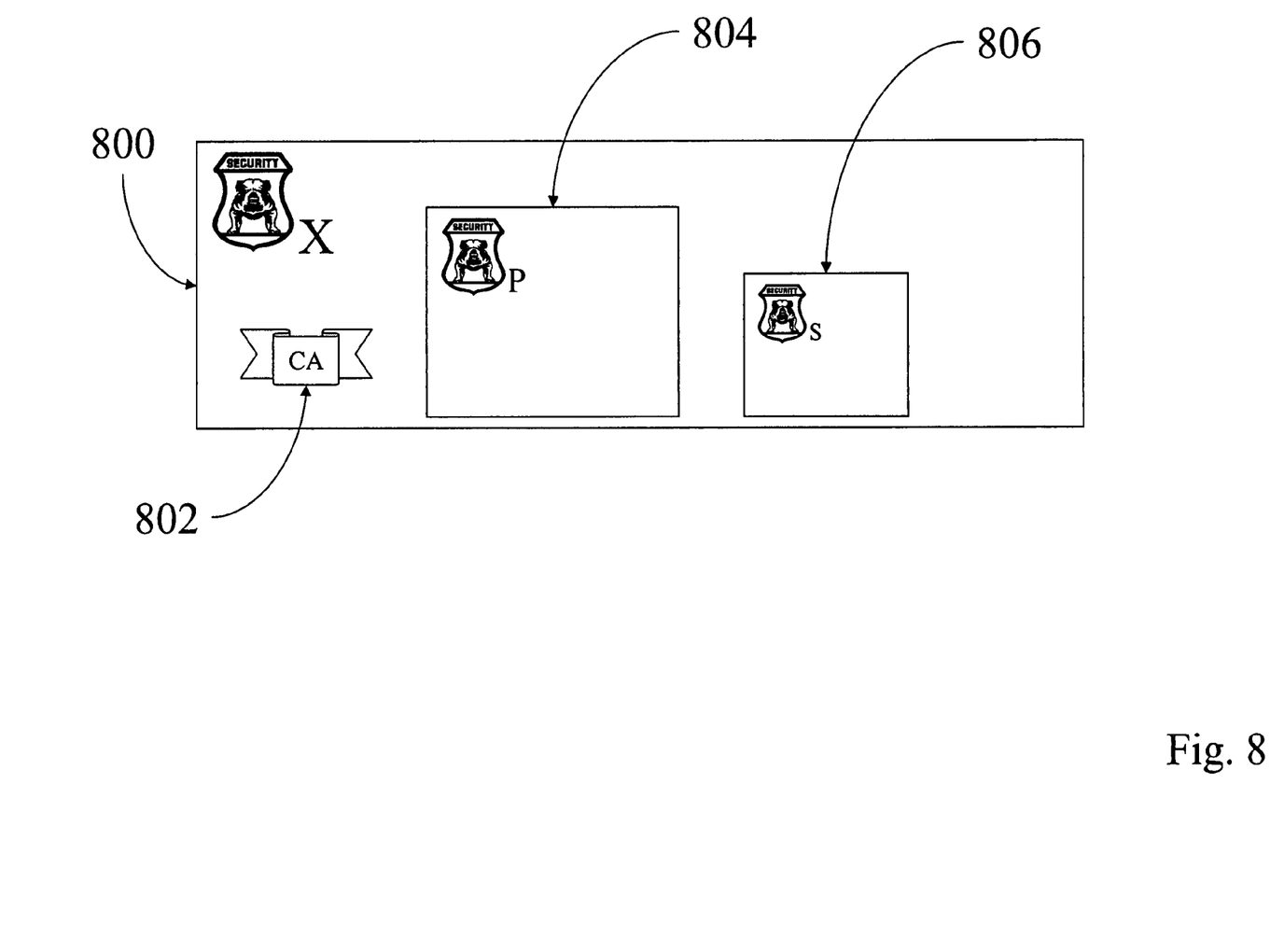
FIG. 8 is a block diagram illustrating at least three layers of security provided by one embodiment of the present invention.

FIG. 8 is a block diagram illustrating at least four layers of security that may be implemented in an embodiment of the invention. The first layer of security is gained by encrypting session traffic 800 with session key X, such as that obtained by negotiating a secured communications channel with a service provider or trusted authority through a symmetric public key system (S-PKS) as described previously. Further, session traffic 800 includes payload file 804 that is being delivered to a client from a service provider or trusted authority, where payload file 804 may be encrypted with secret key P. Additionally, in order to provide a means for authenticating the payload file, the service provider or trusted authority may provide a hash (checksum and/or CRC) value 806 generated from the original, intended payload file (not shown in FIG. 8), as described previously. The hash function may also be signed by hash secret key S, which provides the third layer of security. Hash secret key S may be securely shared with the client using the same methods as previously described for session key X (or it may have been previously provided to the client upon manufacture). Alternately, hash secret key S may be securely obtained from a trusted authority or a different service provider (i.e., one that is authorized to distribute hash secret keys) through an S-PKS secured connection, for example. In one embodiment, hash file 806 may be obtained with a keyed non-compressing one-way hash function or, alternately, it may be omitted and the payload may be signed using a keyed compression one-way hash function. The session traffic may further include CA code 802 for instructing the client MMU to allow access to secured portions of long-term memory, where CA 802 may also be encrypted with an additional secret key K (not shown in FIG. 8).

Those skilled in the art will recognize that the present invention may allow clients to log information on transmissions received from service providers, upgrades provided by the service providers, and dates/times the service providers offered updates or made transmissions. Accordingly, with each upgrade, a client may store the supplying service provider's identifier, the date/time of upgrade, and any other relevant information on the upgrade, thereby keeping a comprehensive log of upgrades and communication that may be accessed for any future troubleshooting needs. The log may also be periodically transmitted to the trusted authority, so that the trusted authority may be able to detect any malicious or otherwise undesirable transmissions made by compromised service providers. Accordingly, when the trusted authority receives such an indication that an existing service provider has been compromised, the trusted authority may revoke the authorization of the compromised service provider (e.g., by removing the public key values associated with the compromised service provider from the public key table, removing the compromised service provider from a white list, adding the compromised service provider to a black list, and/or transmitting a warning to clients not to communicate with the compromised service provider).

Finally, those skilled in the art will recognize that a computer controller and memory devices may be implemented in one or more of the trusted authority, the service providers, and the clients for implementing embodiments of the invention, described above. Furthermore, the trusted authority, service providers, and clients may include receivers, transmitters, and/or transceivers for sending and receiving messages in a communications medium, as previously described.

Although illustrated and described above with reference to certain specific embodiments, the present invention is nevertheless not intended to be limited to the details shown. Rather, various modifications may be made in the details within the scope and range of equivalents of the claims and without departing from the invention.

The invention claimed is:

1. A system for securing long-term storage in an electronic device, the system comprising:
 a partitioned memory including one or more areas of long-term storage, including at least one area of secured long-term storage and at least one area of unsecured long-term storage;
 a memory management unit for managing at least the secured long-term storage area of the memory;
 a security component for regulating access to at least the secured long-term storage area, the security component including:
  a controller including a memory security application for receiving and authenticating a cryptographic authorization code that controls access to at least the secured long-term storage area, the controller being configured to:
   generate an encryption value for an authorized provider by performing a fast cryptographic algorithm using an identifier of the authorized provider and a secret key of the electronic device;
   combine an encryption value for the electronic device and the cryptographic authorization code to generate a result;
   authenticate the cryptographic authorization code by comparing the result with the encryption value for the authorized provider; and
   send instructions from the memory security application to the memory management unit to disable writing into at least the secured long-term storage area of the memory if the security application does not authenticate the cryptographic authorization code;
 wherein the security component is implemented by dedicated circuitry.

2. A system according to claim 1, wherein the memory management system operates in an address space, the secured long-term storage is accessed using a portion of the address space and the memory security application controls access to the portion of the address space.

3. A system according to claim 1 wherein the memory security application includes an authenticating process selected from a group consisting of a Triple Data Encryption Standard (3DES) algorithm, an Advanced Encryption Standard (AES) algorithm, a Rivest Shamir Adleman (RSA) algorithm and a Symmetric Algorithm Based Public Key Standard (S-PKS) algorithm.

4. A system according to claim 1, wherein the security component further comprises a data security application including predetermined decryption algorithms for receiving, validating and saving the data.

5. A system according to claim 1, wherein the secured long-term memory includes data selected from a group consisting of:
 an operating system kernel;
 the data and memory security applications;
 one or more firmware configurations for reconfigurable hardware elements;
 one or more secret key values; and one or more checksum, CRC and hash values of the data.

6. A system according to claim 1, wherein the memory includes a further secured long-term storage area for storing one or more of:
 one or more secret key values;
 one or more checksum, CRC and hash values of data stored in the secured long-term storage;
 a communications log;
 and an installation log.

7. A system according to claim 6, wherein the further secured long-term storage area is configured to be accessed only by the security component.

8. A system according to claim 1, further comprising a temporary storage for storing, at least, received data waiting to be validated and saved to the secured long-term storage by the data security application.

9. A system according to claim 1, further comprising a receiver for receiving data through a medium selected from a group consisting of: a wired network, a wireless network, a secure digital card, a portable storage device, an infrared channel, a satellite link, a fiber optic link, a cable link, and a digital subscriber line.

10. The system according to claim 1, wherein the fast cryptographic algorithm is selected from a group consisting of a block cipher algorithm and a keyed one-way hash function.

* * * * *